Oct. 22, 1968

J. J. H. G. DAAMEN 3,406,654

CONE MARKING APPARATUS

Filed Nov. 30, 1966

INVENTOR.
JACOBUS J. H. G. DAAMEN
BY

Oct. 22, 1968  J. J. H. G. DAAMEN  3,406,654
CONE MARKING APPARATUS

Filed Nov. 30, 1966  2 Sheets-Sheet 2

INVENTOR.
JACOBUS J. H. G. DAAMEN

United States Patent Office 3,406,654
Patented Oct. 22, 1968

3,406,654
CONE MARKING APPARATUS
Jacobus J. H. G. Daamen, Arnhem, Netherlands, assignor to American Enka Corporation, Enka, N.C., a corporation of Delaware
Filed Nov. 30, 1966, Ser. No. 598,002
Claims priority, application Netherlands, Dec. 10, 1965, 6516062
3 Claims. (Cl. 118—2)

ABSTRACT OF THE DISCLOSURE

Apparatus for marking telescopically arranged textile cones embracing apparatus having a removable marking cartridge including a flexible applier and spring-loaded mechanism for controlling marking liquid flow.

---

This invention relates to apparatus for marking or identifying cones which are used for supporting a quantity of natural or man-made yarns. More particularly, the invention relates to an improvement in apparatus identified in U.S. Patent No. 2,920,605. The patent shows apparatus for applying identification markings to curved tops of yarn cones utilizing means for supporting a plurality of telescopically arranged cones and means for marking cones so arranged.

Simple mechanical cone marking apparatus of the general type disclosed by the patent are proposed to facilitate identifying paper and/or plastic cones by providing individual marks to the cones, usually marks of different colors, where each mark identifies a particular type yarn. One or more marks are placed on the top rim of the cone and the color or number of the marks is representative of the nature of the yarn material, i.e., the denier and/or the number of filaments, etc., of the yarn supported by the cone. If satisfactorily done, the cones thus marked make it possible to distinguish the various type yarns supported thereon so that they may be properly packaged for shipment and/or storage.

It is essential that marking apparatus must satisfy certain requirements before they can be used. For example, they must not damage the cones nor should they place the markings too far on the outer portion of the cone rim. Placing the markings too far over on the rim causes contact of the yarn with the marking as it is being removed from the package. It is also essential that the cones be marked as clearly as possible in order to keep the individual yarn packages separate.

To obtain selected markings using the device of the patent, a number of cones are arranged in a stack with each of the cones overlapping each other, i.e., arranged as a telescoping unit, over usually an upright coaxial tubular support. The tubular support has, at one end, at least one removable marking cartridge adapted to cooperate with an applicator which marks in the general vicinity of the tip of the cones as they are placed on the support.

While it has been found that the device is certainly better and more expedient to use than the time-consuming methods and devices formerly used in applying identification markings by hand, it has not been very extensively used because of some serious drawbacks. The more serious drawbacks are caused primarily by the fact that the marking wheels of known devices fail to project out sufficiently far from the marking liquid storage cartridge and in the fact that the marking liquid is exuded from the wheel before it is in a proper operating position. As a direct result thereof, the identification marks will therefore be placed on the inner portion of the rim. Perhaps more significantly, difficulty is also often encountered in that the marking wheel physically damages the cones while in operation and/or leaks the marking liquid to the cones when idle.

It is therefore the chief aim and concern of the present invention to provide an improved apparatus for marking yarn supports (cones) which avoid the above drawbacks and therefore:

It is a primary object of the present invention to provide a yarn marking apparatus which dispenses a required amount of a marking liquid to the yarn support member (cone) and at a readily visible location on said member.

It is a further object of the invention to provide a yarn marking apparatus which does not inadvertently leak marking liquid either when in use or in non-use and, moreover, does not otherwise damage the yarn support member when in operation.

In the attainment of these and related ends, construction is provided wherein in a marking cartridge which is adapted to comprise the major segment of an apparatus for marking yarn supporting packages (cones), means is provided to more efficaciously mark the cone and means is provided to control the flow of a marking liquid. A resilient tubular shaped member extends from the cartridge and is cut away or "bevelled" at one end and connected to a marking liquid reservoir at the opposite end. To control marking liquid flow of the liquid from the resilient tube to the cone, a pin projects from the cartridge which, by way of a novel transmission mechanism, operates a stop-clamp mechanism. The clamp mechanism embraces the tube behind the liquid applying cutaway or bevelled (free) end and is opened when the pin is pressed upwardly (against the action of a spring and in the direction of the tubular member).

The term "bevelled" is to be understood as being the end of the supplier and which is any shape that deviates from a vertical section; in other words, cutaway and corresponding generally to the curved topmost portion of the yarn cone.

The term "yarn support" is the generic term for those tubular members, usually frusto-conical in shape, which are adapted to maintain a quantity of threads or yarn.

This apparatus briefly described above has several advantages over known construction. The presence of the pin projecting from the cartridge makes it possible that a marking liquid to be supplied in proper amounts before the bevelled portion of the tube is in contact with the top rim of a yarn support (cone). Inasmuch as the tube is resilient and bevelled, it extends to the topmost portion of the cone to facilitate transfer of the marking liquid, i.e., paint, and when the cone is further displaced (relative to the resilient tube), the tube springs back without the top rim being damaged in any manner whatsoever. Moreover, as a result of the tube, usually made of rubber, being bent back (by the top rim of the cone), it is squeezed closed and thereby prevents any after-dripping of marking liquid.

Another advantage over the prior art resides in the fact that the conduit and tube through which the marking liquid is supplied are considerably wider than a similar passage in any known apparatus. As a direct result, chances of clogging are significantly reduced; provided the apparatus is periodically cleaned, it can be completely avoided. The bevelled or cutaway end segment of the tube serves to effect satisfactory transfer of marking liquid as soon as it is in contact with the cone rim.

It has been found that best results are obtained when the cutaway section approximates at least 85% of the open cross-sectional area of the tube. Its shape, therefore, corresponds generally to that of the inner portion of the top rim of the cone. As a result, from the first contact of the tubular member with the cone, part of its cross-sectional area remains open, so that when the resilient tubular member is bent by the top rim of the cone, marking liquid will be squeezed out through the remaining cross-sectional area.

Although various constructions are conceivable to enable a clamp mechanism to completely shut off the tube, it has been found that the tube is closed completely if, according to the invention, a stop-clamp comprising two parallel, vertical clamp shoes is caused to embrace the tube. Alternatively, it is conceivable that should the pin be directly coupled to a slidable bushing which presses one side of the tube against a fixed anvil, flow could possibly be stopped. The illustrated embodiment is preferred, however.

When the pin is not in contact with the cones, the marking tube should be closed. To this end, the stop-clamp is closed when the pin projects farthest from the cartridge. According to the invention, this is effected by attaching the clamp shoes to the ends of two leaf springs. The springs are forced apart with the aid of a wedge that forms part of the transmission mechanism between the pin and the stop-clamp.

In operation of the device, the rod with the marking cartridge can be passed through a telescopic unit of cones and usually through the same end thereof; however, a much simpler manner of operation is realized providing the rod and several of the cones (telescopically arranged) are made to reciprocate relative to each other. In this manner, the rod, from its lowest position, is first passed upwardly through the cone, with no marks being applied. After moving the rod downwardly, however, the top rims of the cones are marked. In order that, during the upward movement of the rod, the pins may freely pass through the top rims of the cone, it is preferred to use an embodiment wherein a pin is rotatably and resiliently attached to a lever and wherein the pin can be turned, relative to the lever, and against the action of a spring (in the direction of the resilient tube). When the rod is moved in an upward direction, the pins will be turned in and will then be able to pass through the top of the cone. When moving the rod upwardly, the pin will, by way of the lever, operate the stop-clamp any time a pin passes a cone's top rim.

The viscosity of the marking liquid also affects performance of the device and, should the liquid be relatively thin, the stop-clamp need be open only a very short time; if, on the other hand, the liquid is relatively thick, the stop-clamp will have to be open a much longer time. In both cases, difficulties are encountered. Should the time during which the stop-clamp is open be too short, it will be difficult to supply an accurately metered amount of liquid to the cone. However, should the stop-clamp be open too long, the relative movement of the rod and the cones will necessarily have to be slower. This slows down production. An optimum viscosity of the liquid has been determined and will be set forth in detail below.

It has been found that the most favorable conditions are obtained providing the point of contact between the pin and the curled top rim of the cone is about 10 mm.— in the longitudinal direction of the rod and towards the tubular member.

In addition to the above-described apparatus, the invention further relates to a method for marking cones utilizing the apparatus. It has been found that certain conditions as to method of operation must be satisfied in order to obtain optimum results utilizing the apparatus. For example, the marking cartridge and the cones must be displaced relative to each other at a speed of 10 cm. per second and the viscosity of the marking liquid passing through the resilient tube must be within a range to allow a feed rate of about 5½ ct. per 3 minutes. Under these conditions very neat marks are placed on the cones at a relatively rapid rate and are placed precisely at the desired points.

A plurality of marking cartridges can be placed on one support rod. The cartridges are usually so attached that they are turned relative to each other through differing angles and therefore will place marks on the top rims of the cone and at different points thereof. Hence, the cones can be provided with any desired identification utilizing any number of marks and in any color.

In continuing, it will also be appreciated that a plurality of rods having marking cartridges may be coupled together and usually in a side-by-side arrangement to the same operating mechanism. In such manner, the output of the apparatus can then, very simply, be multiplied. Identification marks can then suitably be applied in various combinations at the rate of four thousand yarn supports per hour, utilizing the apparatus of the invention.

For a better understanding of the invention, reference is made to the accompanying drawings in which the figures illustrate diagrammatically appropriate embodiments of the apparatus for use in the practice of the invention.

Figure 1:
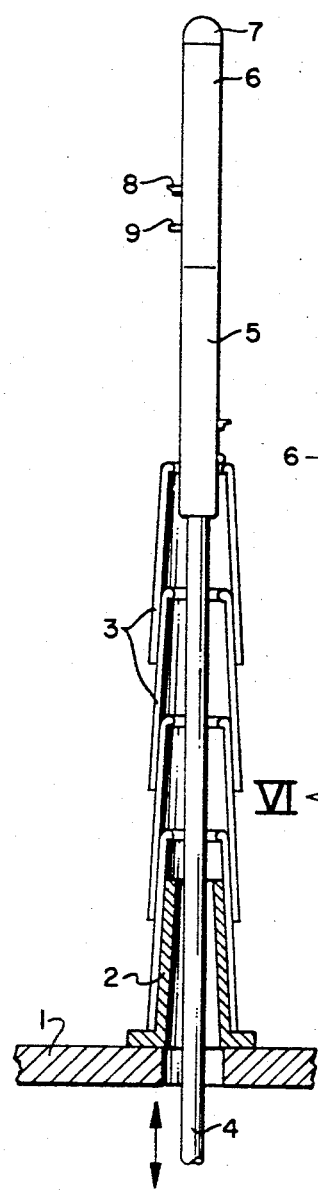
FIGURE 1 shows the arrangement of the apparatus schematically.

In FIGURE 1, reference numeral 1 refers to a base, which is attached to a form 2. Form 2 serves to carry a number of cone-shaped yarn supports 3, hereinafter referred to merely as cones. Although the figure shows only four cones, in actual practice this number will generally be around 25, since cones are commonly supplied by the manufacturers in units of this number.

Passing through the base, form 2, and the stack of cones 3 is rod 4, to the top of which two marking cartridges 5 and 6 are attached. The upper marking cartridge is closed by cap 7. Although the figure shows only two cartridges, more may be used if desired. To facilitate attachment one on top of the other, the cartridges are provided with snaps, hence making it possible to assemble them in any number. With the aid of a mechanism (not shown) rod 4 may be moved up and down and in the direction indicated by the arrows.

Attached to each marking cartridge is rubber tube shaped member 8, and at a somewhat lower level there projects from each cartridge actuating pin 9.

Figure 2:
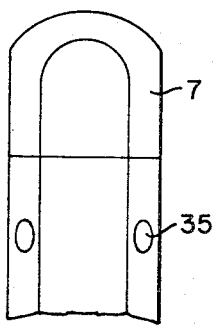
FIGURE 2 shows a marking cartridge, according to the invention.

FIGURE 2 is a detailed view of a single marking cartridge (element 6). It can be seen that rubber tubular member 8 is slipped over conduit 11. The free end of the rubber tubular member slipped over one leg of the conduit is arcuately bevelled.

Conduit 11 (right angular in shape) connects to reservoir 10 which forms the major part of entire cartridge 10. Cap 7 is fastened to cartridge 6 with the aid of securing snap 35. Bottom end 12 of the cartridge is cylindrical and is provided with snap 13 which is analogous to the one with which cap 7 is fastened to cartridge 6. With snap 13, the cartridges 5 and 6 may be intercoupled, with cartridge 5 being connected to rod 4 in a similar manner.

Figure 4:
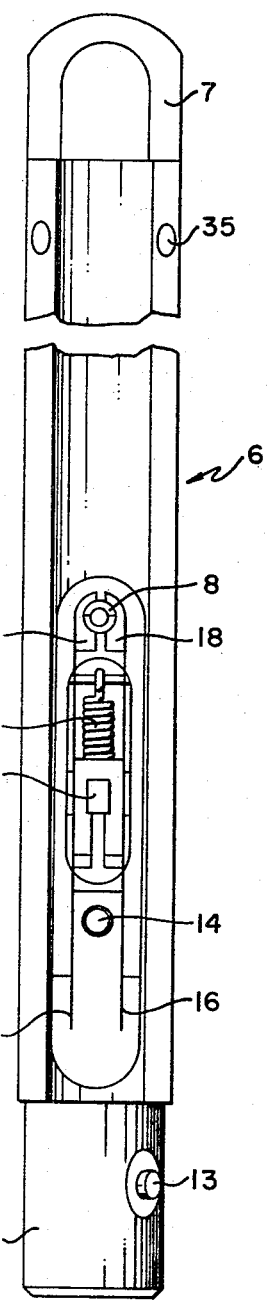
FIGURE 4 is a side view of the marking cartridge of FIGURES 1 and 2.
Figure 3:
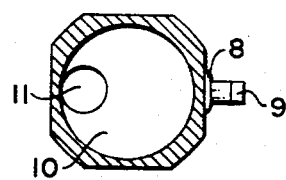
FIGURE 3 shows this marking cartridge in cross section along line III—III in FIGURE 2.

FIGURE 3 shows the cartridge in cross section along line III—III in FIGURE 2. FIGURE 4 is a view from the right of the cartridge 6 shown in FIGURE 2.

Figure 6:
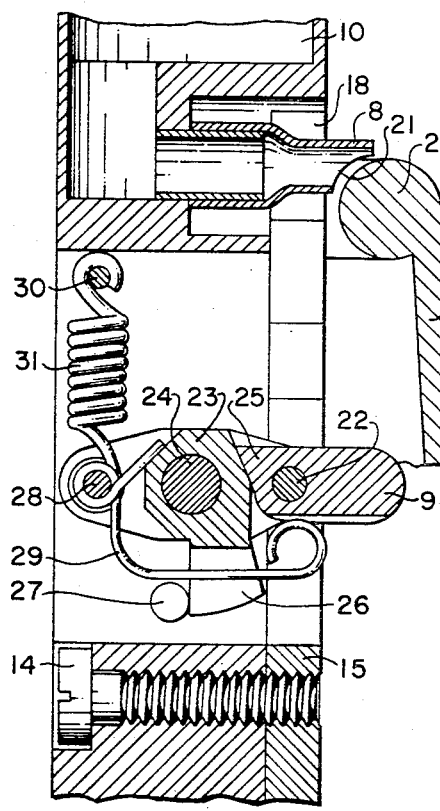
FIGURE 6 shows a detail of FIGURE 2 on a larger scale (enclosed section VI)
Figure 7:
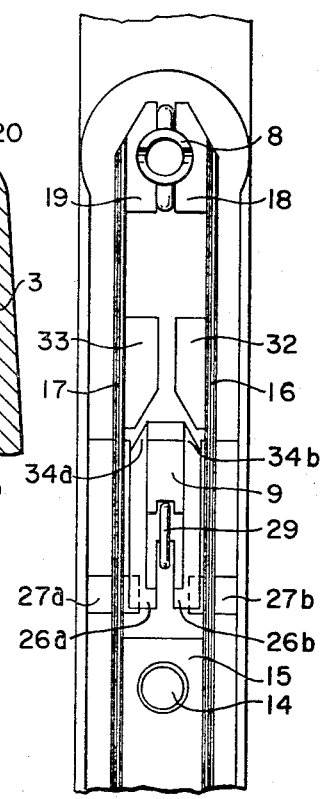
FIGURE 7 shows the same detail in a side view.

FIGURE 2 shows marking cartridge 6 partly in side elevation and partly in longitudinal section. The part of the cartridge indicated in FIGURE 2 by VI is shown on a larger scale in FIGURES 6 and 7, in which the cartridge is in the same position as in FIGURES 2 and 3. In FIGURES 6 and 7 numeral 14 refers to a screw bolt with the aid of which securing member 15 is fastened to the body of the marking cartridge. Attached to member 15 are two leaf springs 16 and 17, which carry at their other ends two clamping shoes 18 and 19 (FIGURES 4 and 7). The clamping shoes may shut off resilient tubular member 8. FIGURE 6 clearly shows the shape of the bevelled end face of tubular member 8 and its position relative to the upper rim 20 of a cone. It therefore can be readily seen that the shape of the bevelled end face 21 is adapted to that of the upper rim of a cone. Pin 9 is rotatable about pivot 22, which in turn forms part of lever 23. Lever 23 may rotate about a pivot forming part of the body of the marking cartridge. When pin 9 is pressed upwards by upper rim 20, lever 23 is turned upwards by cam 25. Tension is then applied to extension spring 31 mounted between a pin 28. Pin 28 is attached to the other end of lever 23 and fixed pin 30. Extension spring 31 will, in all cases, urge lever 23 back to a horizontal position. In that position, movement of the lever is stopped by two projections 26a and 26b, which will then bear against two pins 27 and 27b. When lever 23 is moved upwards by pin 9, wedge 34, attached to the lever, will be pressed between two blocks 32 and 33 having cooperating bevelled surfaces. As a result, leaf springs 16 and 17 are then spread apart. Clamp shoes 18 and 19 will then open tubular member 8 and through which marking liquid is then allowed to flow.

When rod 4 is pushed upwards through the cone, pin 9 will turn about pivot 22 and move inwards against the slight pressure of spring 29. Each time pin 9 has passed a cone rim, it will spring back to its initial position and, subsequently, when rod 4 is moved in downward direction, lever 23 will be actuated.

Figure 5:
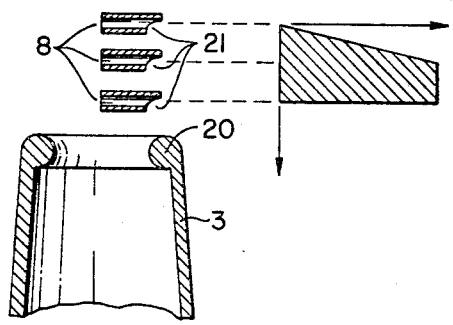
FIGURE 5 illustrates the function of the resilient tubular member.

FIGURE 5 schematically shows the variation in width of the passage in tubular member 8 as the upper rim of a cone approaches contact. In the top position, clamp shoes 18 and 19 begin to move apart, and this movement continues up to the mid-position. Tubular member 8 is then fully open for a short distance and, when pin 9 slips off upper rim 20, tubular member 8 is again rapidly closed.

The entire cycle of opening and closing is completed while rod 4 is displaced relative to cones 3 over a distance of 10 mm. Rubber tube 8 is again closed before it reaches the upper rim of the next cone. Therefore, only the amount of marking liquid to the right of the clamp shoes is transferred to the support rim.

Favorable results are obtained if use is made of a rubber tubular element having an outside diameter of 3.4 mm. and an inside diameter of 2.6 mm. By diluting a marking liquid such as paint with a suitable thinner, an appropriate viscosity may be obtained. It has been found that paint having a viscosity where its time of outflow from a No. 4 DIN cup (German Industrial Standards) is 6 minutes is satisfactory. As understood by those skilled in the art, this method of measuring viscosity is well known and generally comprises allowing a viscous liquid to flow through an opening of 4 mm. from a standard cup (Ford cup) provided with an overflow rim. The shape and capacity of this cup are specified in DIN standards.

It has been found that with the present apparatus one can provide large numbers of cones with identification marks and in many different combinations. Generally, unskilled production personnel can mark the cones at a rate which heretofore has been impossible without the cones sustaining damage. The marks are perfectly identical, and very few of the cones need to be rejected.

What is claimed is:

1. In an apparatus for applying one or more identification marks to curved top rims of cone-shaped yarn supporting members comprising a base for carrying a plurality of the supporting members arranged as a telescopic unit, a rod passing through said base and positioning at one end at least one detachable marking cartridge having a reservoir for a marking liquid, said rod and base being movable relative to each other the improvements comprising in combination a resilient, tubular marking liquid dispensing member projecting outwardly from the cartridge and having a cutaway end portion adapted to apply a marking liquid to a yarn support, a marking liquid flow control actuating means also projecting outwardly from said cartridge and positioned immediately below said liquid dispensing member, and means connecting said actuating means to the marking liquid dispenser member for controlling marking liquid flow.

2. Apparatus as defined in claim 1 wherein said means connecting said actuating means to the marking liquid dispenser member for controlling marking liquid flow comprises a clamping means, said clamping means adapted to embrace the tubular member behind its cutaway end in order to block marking liquid flow, said clamping means being adapted to be opened and closed when said actuating means is pressed against the action of a spring mechanism mounted in said cartridge.

3. An apparatus according to claim 2 wherein the clamping means compirses two parallel, vertical clamping shoes adapted to embrace the tube.

References Cited

UNITED STATES PATENTS

| 1,306,643 | 6/1919 | Swan | 118—408 X |
| 2,355,232 | 8/1944 | Nelson et al. | 118—317 X |
| 2,920,605 | 1/1960 | Humphries | 118—244 |
| 2,937,107 | 5/1960 | Phillips | 118—317 X |
| 3,106,491 | 10/1963 | Leibner | 118—2 |

CHARLES A. WILLMUTH, *Primary Examiner.*

JOHN P. McINTOSH, *Assistant Examiner.*